United States Patent
Pasolini et al.

(10) Patent No.: US 7,463,997 B2
(45) Date of Patent: Dec. 9, 2008

(54) PEDOMETER DEVICE AND STEP DETECTION METHOD USING AN ALGORITHM FOR SELF-ADAPTIVE COMPUTATION OF ACCELERATION THRESHOLDS

(75) Inventors: Fabio Pasolini, S. Martino Siccomario (IT); Ivo Binda, Voghera (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 3 days.

(21) Appl. No.: 11/537,933

(22) Filed: Oct. 2, 2006

(65) Prior Publication Data
US 2007/0143068 A1    Jun. 21, 2007

(30) Foreign Application Priority Data
Oct. 3, 2005    (EP)    ............................. 05425683

(51) Int. Cl.
*G01C 22/00* (2006.01)
(52) U.S. Cl. ........................... 702/160
(58) Field of Classification Search .......... 702/141, 702/150–154, 158, 160; 600/595; 73/490, 73/510
See application file for complete search history.

(56) References Cited

U.S. PATENT DOCUMENTS

| | | | | |
|---|---|---|---|---|
| 5,583,776 A | 12/1996 | Levi et al. | ................ | 364/450 |
| 6,052,654 A | 4/2000 | Gaudet et al. | ................ | 702/160 |
| 6,135,951 A | 10/2000 | Richardson et al. | ......... | 600/300 |
| 6,826,477 B2 * | 11/2004 | Ladetto et al. | .............. | 701/217 |
| 6,898,550 B1 | 5/2005 | Blackadar et al. | ........... | 702/182 |
| 2006/0020177 A1 * | 1/2006 | Seo et al. | .................... | 600/300 |
| 2007/0073514 A1 * | 3/2007 | Nogimori et al. | ........... | 702/160 |
| 2007/0143069 A1 * | 6/2007 | Pasolini et al. | .............. | 702/160 |
| 2007/0198187 A1 * | 8/2007 | Pasolini et al. | .............. | 701/220 |

FOREIGN PATENT DOCUMENTS

GB    2 359 890    9/2001

* cited by examiner

*Primary Examiner*—Michael P Nghiem
(74) *Attorney, Agent, or Firm*—Lisa K. Jorgenson; Dennis M. de Guzman; Seed IP Law Group PLLC

(57) ABSTRACT

In a pedometer device for detecting and counting steps of a user on foot, an accelerometer sensor detects a vertical acceleration generated during the step. A processing unit, connected to the accelerometer sensor, processes an acceleration signal relating to the acceleration in order to detect the occurrence of a step, and in particular compares the acceleration signal with a first reference threshold. The processing unit automatically adapts the first reference threshold as a function of the acceleration signal. In particular, the processing unit modifies the first reference threshold as a function of an envelope of the amplitude of the acceleration signal.

30 Claims, 5 Drawing Sheets

PEDOMETER DEVICE AND STEP DETECTION METHOD USING AN ALGORITHM FOR SELF-ADAPTIVE COMPUTATION OF ACCELERATION THRESHOLDS

BACKGROUND OF THE INVENTION

1. Field of the Invention

The present invention relates to a pedometer device and to a step detection method using an algorithm for self-adaptive computation of acceleration thresholds.

2. Description of the Related Art

Step-counting devices (referred to in general as pedometers) are known, which, being carried by a user, enable measurement of the number of steps made, and calculation of the distance traveled, as well as supplying of additional information, such as, for example, the average speed, or the consumption of calories.

Pedometers are advantageously used in inertial navigation systems (the so-called dead-reckoning systems) applied to human beings. Such systems trace the movements of a user, by identifying and measuring his/her displacements starting from a known starting point, without resorting to the use of a Global Positioning System (GPS), or by acting as aid to a GPS. In said systems, a compass supplies the information linked to the direction of displacement, and the pedometer supplies the information linked to the amount of said displacement. Pedometers are also used in a wide range of applications in the clinical sector (for example, in rehabilitation), and in general in the field of fitness (for example, as instruments for monitoring a physical activity).

In particular, pedometers are known that use integrated accelerometers of a MEMS (micro-electromechanical system) type for step detection. In particular, such pedometers have particularly compact dimensions, and can be advantageously integrated within portable devices, such as mobile phones, Mp3 readers, camcorders, etc.

The aforesaid pedometers implement a step detection method based upon the analysis of the pattern of a vertical acceleration, which is generated during the various phases of the step by the contact of the foot to the ground, and which is detected by an accelerometer fixed to the body of the user. In this connection, it is emphasized that "vertical acceleration" means herein an acceleration directed along the vertical of the user's body. In particular, the occurrence of a step is determined by identifying acceleration peaks that appear in the acceleration signal, and said peaks are detected by comparing the acceleration signal with a given reference threshold, having a pre-set value.

However, even though the acceleration signal has a profile that is repeatable at each step, its pattern (and, in particular, its amplitude and temporal extension) has a wide variability according to a number of factors that affect the gait, such as the resting surface, the type of shoe worn (rigid sole or flexible sole, etc.), and the speed of the gait (slow walking, fast walking, running, etc.). Furthermore, each individual user has given characteristics and peculiarities that affect the gait, differentiating it from that of other users.

It follows that a step detection based upon the comparison of the value of the acceleration signal with a reference threshold having a pre-set value for the detection of acceleration peaks, involves the occurrence of errors that may even be considerable in counting of the steps, and in the measurement of the distance traveled. In particular, if the threshold is too low, spurious signals, rebounds, or noise in general, may be counted as steps; on the other hand, if the threshold is too high, some steps may not be detected.

BRIEF SUMMARY OF THE INVENTION

One embodiment of the present invention provides a pedometer device and a method for detecting and counting steps which will enable the aforesaid disadvantages and problems to be overcome.

One embodiment of the invention is a pedometer device for detecting and counting the steps of a user. The device includes an accelerometer sensor configured to detect an acceleration generated during a step; and a processing unit connected to the accelerometer sensor, and configured to process an acceleration signal relating to the acceleration to detect the occurrence of a step. The processing unit includes a first comparator configured to compare the acceleration signal with a first reference threshold, and a threshold-adaptation circuit configured to modify the first reference threshold as a function of the acceleration signal.

One embodiment of the invention is a step detection method for detecting steps in the gait of a user. The method includes producing an acceleration signal relating to an acceleration generated during a step; and processing the acceleration signal to detect the occurrence of the step. The processing step includes comparing the acceleration signal with a first reference threshold, and modifying the first reference threshold as a function of the acceleration signal.

BRIEF DESCRIPTION OF THE SEVERAL VIEWS OF THE DRAWINGS

For a better understanding of the present invention, preferred embodiments thereof are now described, purely by way of non-limiting example and with reference to the attached drawings, wherein.

DETAILED DESCRIPTION OF THE INVENTION

Figure 1:
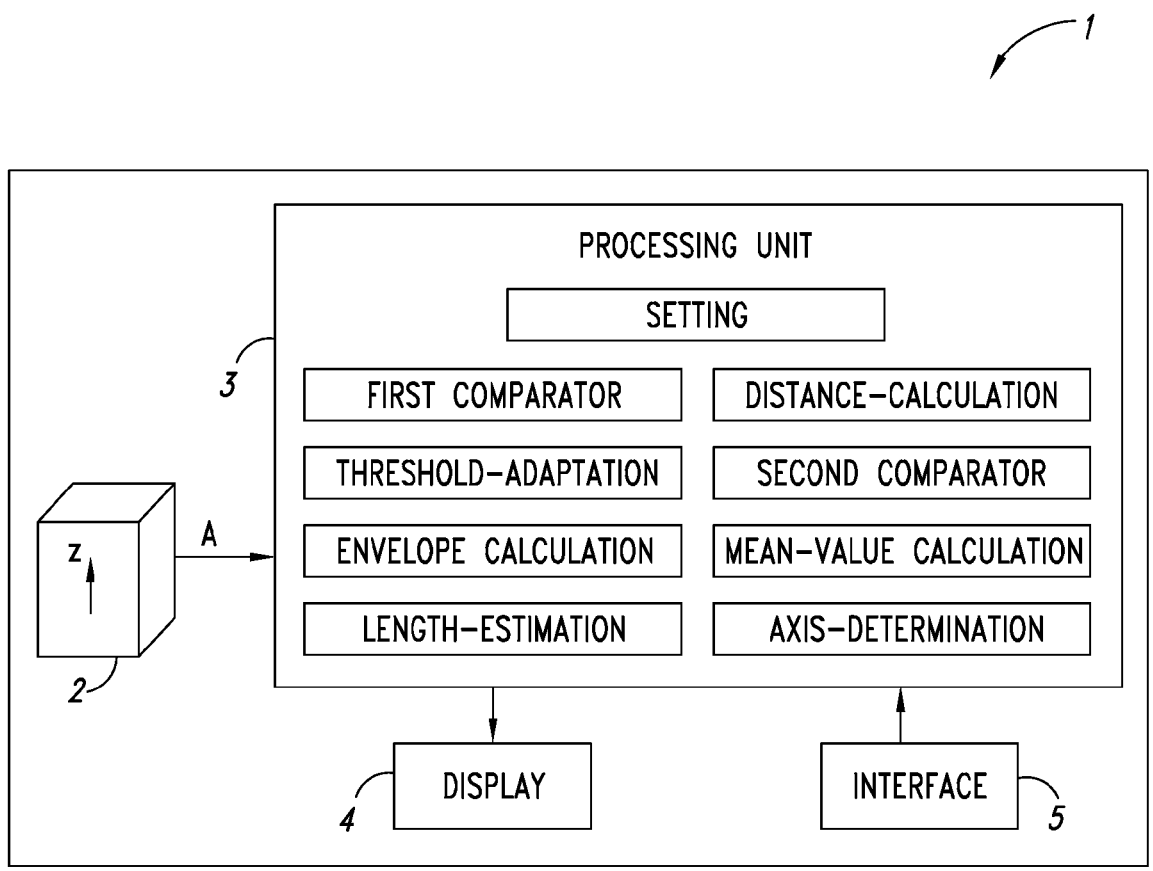
FIG. 1 shows a block diagram of a pedometer device.

FIG. 1 is a schematic illustration of a pedometer device 1, comprising an accelerometer 2, of a linear type and having a vertical detection axis z, and a processing unit 3, connected to the accelerometer 2. Advantageously, the accelerometer 2 and the processing unit 3 are mounted on the same printed circuit, housed inside a casing of the pedometer device 1 (not illustrated). The pedometer device 1 is carried by a user, for example on his belt or on his shoulder, so as to be fixed to the body of the user and be able to sense vertical accelerations that occur during the step, caused by the impact of the feet on the ground.

The pedometer device 1 further comprises a display screen 4, connected at an output of the processing unit 3, and an interface 5, connected at an input of the processing unit 3. The display screen 4 displays information at output from the pedometer device 1, such as the number of steps, the distance traveled, etc. The interface 5, for example, including push-buttons, an alphanumeric keypad, communication ports, etc., allows the user to communicate with the processing unit 3 (for example, by entering data).

The accelerometer 2 is advantageously an integrated sensor of semiconductor material, made using the MEMS technology, of a known type and thus not described in detail herein. In use, the accelerometer 2 detects the component along the detection axis z of the vertical acceleration generated during the step, and produces a corresponding acceleration signal A.

Figure 2:
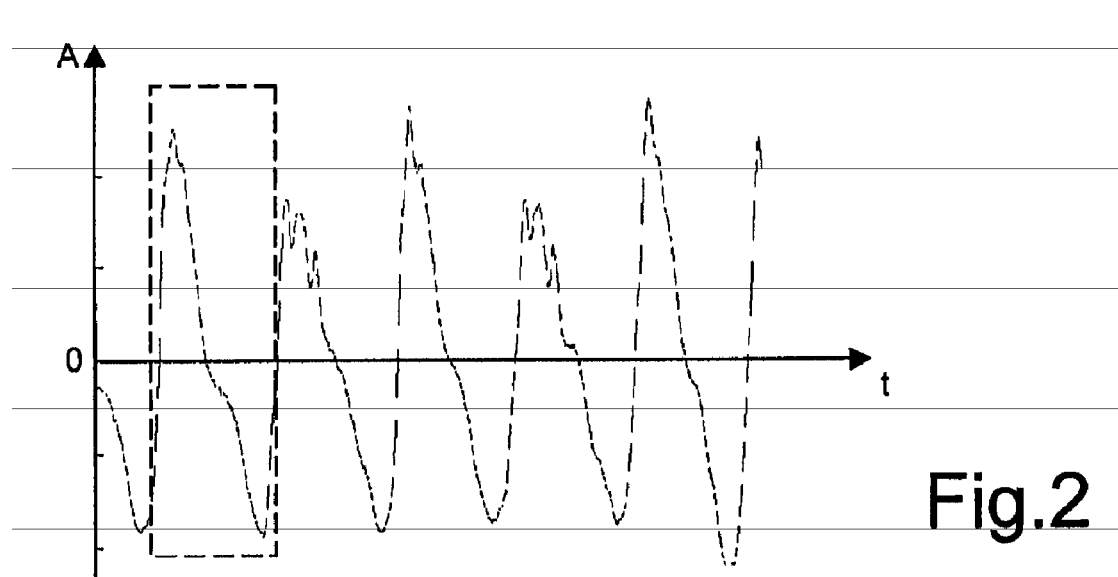
FIG. 2 shows a graph corresponding to the pattern of an acceleration signal during a step.

As shown in FIG. 2, the pattern of the acceleration signal A (with the d.c. component filtered out) in time t has a given acceleration profile which repeats at each step (indicated by the dashed rectangle). In detail, the acceleration profile comprises in succession: a positive phase, in which a positive-acceleration peak occurs (i.e., directed upwards), due to contact and consequent impact of the foot with the ground; and a negative phase in which a negative-acceleration peak occurs (i.e., directed downwards) due to rebound, having an absolute value smaller than that of the positive-acceleration peak.

The processing unit 3, comprising a microprocessor circuit (for example, a microcontroller or DSP), acquires at pre-set intervals samples of the acceleration signal A generated by the accelerometer 2, and executes appropriate processing operations for counting the number of steps and measuring the distance traveled. As will be described in detail hereinafter, the processing unit 3 compares the value of the acceleration signal A (with the d.c. component filtered out) with a positive reference threshold $S^+$ and with a negative reference threshold $S^-$, for identifying, respectively, the positive phase (positive acceleration peak) and the negative phase (negative acceleration peak) of the step.

According to one embodiment of the present invention, the values of the positive and negative reference thresholds $S^+$, $S^-$ are not fixed and equal to a given pre-set value, but are calculated in a self-adaptive way (i.e., in a way that adapts without any external intervention from a user) by the processing unit 3, based on the values assumed by the detected acceleration. In particular, as will be clarified hereinafter, the values of the positive and negative reference thresholds $S^+$, $S^-$ are modified at each acquisition of a new sample of the acceleration signal A, as a function of the value of a positive and negative amplitude envelope of the acceleration signal, in such a manner that the reference thresholds vary with time approximately following said envelopes. The pedometer device 1 thus adapts to variations in the detection conditions (and, in particular, to different profiles of the acceleration signal, in terms of amplitude and duration), due, for example, to a different type of terrain, or to an increase in the speed of the gait.

Figure 3:
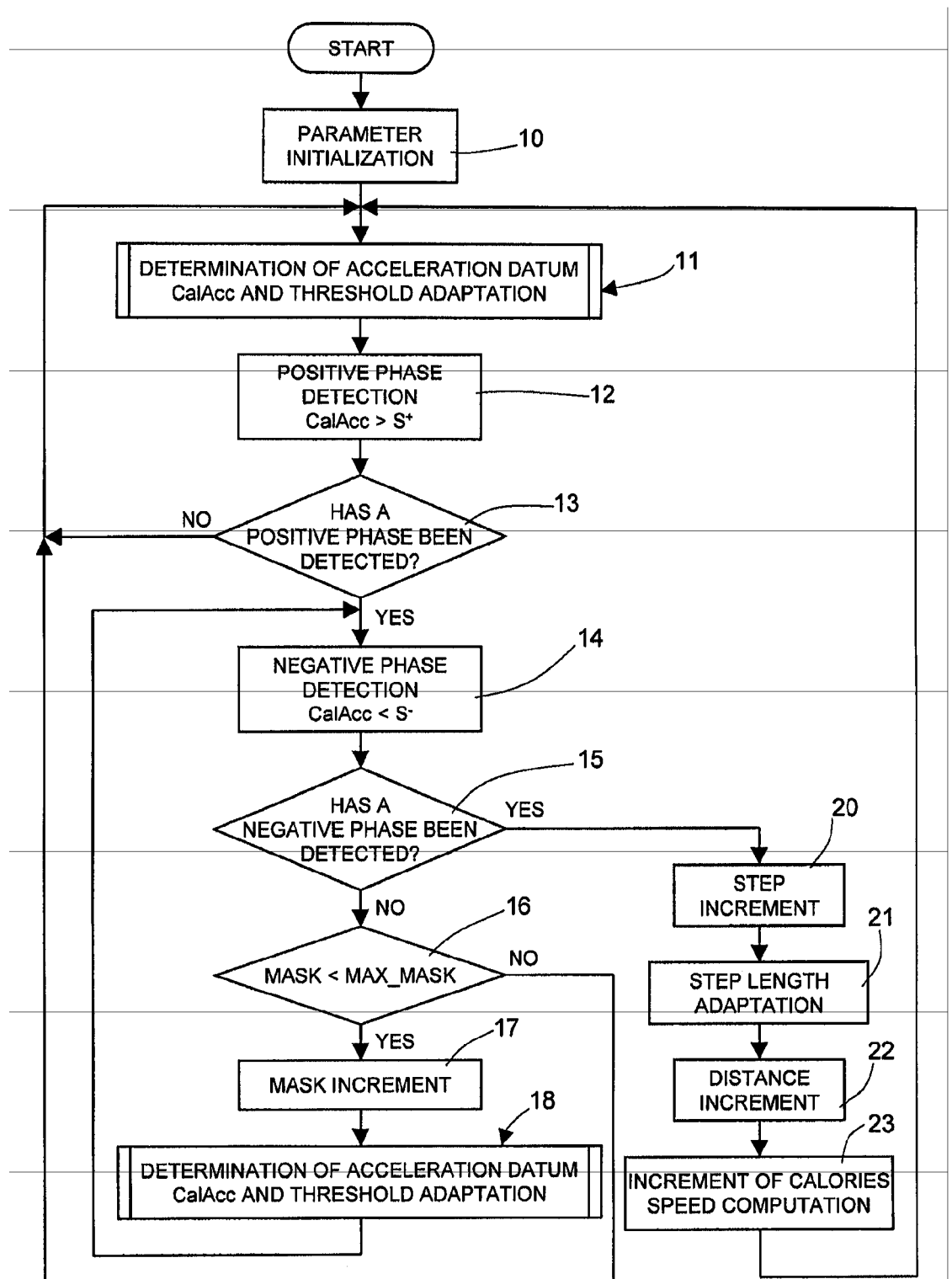
FIG. 3 shows a flowchart corresponding to operations of detection and counting of steps, executed by a processing unit of the pedometer device of FIG. 1.

The algorithm implemented by the processing unit 3 for performing, among other things, the operations of step counting and of traveled distance measurement is now described, with reference to FIG. 3. Said algorithm envisages the analysis of the acceleration signal A in order to look for a positive phase of the step followed by a negative phase within a pre-set time interval from the occurrence of the positive phase. In the case where said sequence occurs (which indicates the occurrence of a step), counting of the steps and measurement of the total distance traveled are updated; otherwise, the algorithm returns to the initial condition of looking for a new positive phase of the step. In particular, the positive acceleration peaks that occur within the pre-set time interval are ignored by the algorithm (in so far as they can be ascribed to phenomena of noise, such as impact, anomalous rebounds, etc.).

In detail, the algorithm starts with initialization, block 10, of the values of the positive and negative reference thresholds $S^+$ and $S^-$, respectively, at a positive minimum value $S_1$ and at a negative minimum value $S_2$, the latter being smaller, in absolute value, than the positive minimum value $S_1$. As will be clarified, said minimum values represent limit values below which the reference thresholds are not allowed to drop. In addition, the values of a positive envelope $Env^+$ and of a negative envelope $Env^-$ of the acceleration signal A (which will subsequently be used for modification of the reference thresholds) are initialized, respectively, at the positive minimum value $S_1$ and at the negative minimum value $S_2$.

Figure 4:
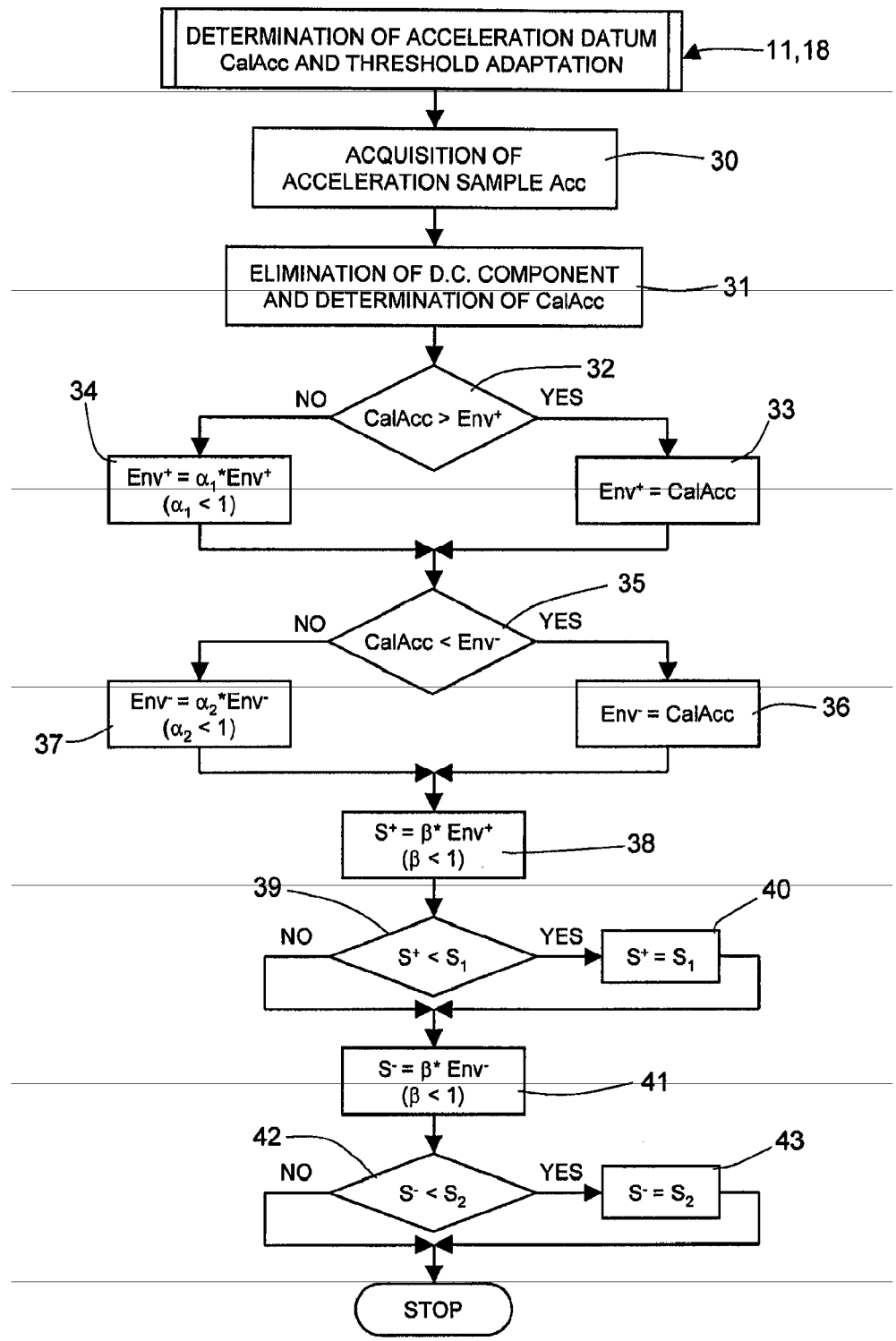
FIG. 4 shows a flowchart corresponding to operations of self-adaptive modification of acceleration thresholds, executed by the processing unit of the pedometer device of FIG. 1.

Next, block 11, the processing unit 3 determines a first acceleration datum CalAcc, and consequently modifies the values of the reference thresholds (as will be described in detail hereinafter with reference to FIGS. 4 and 5).

The algorithm then proceeds, block 12, with the search for the positive phase of the step, by comparing the value of the acceleration datum CalAcc with the positive reference threshold $S^+$, to detect a positive acceleration peak of the acceleration signal A.

Until a positive phase of the step is found, block 13, the algorithm proceeds with acquisition of a new acceleration datum CalAcc in block 11 (and corresponding modification of the reference thresholds), and with the comparison of said new acceleration datum with the positive reference threshold $S^+$.

The positive phase is detected when the acceleration datum exceeds the positive reference threshold $S^+$ and then drops below the positive reference threshold, the instant of detection of the positive phase corresponding to the instant in which the acceleration datum drops again below the positive reference threshold $S^+$. At this instant, the processing unit 3 stores the value assumed by the positive reference threshold $S^+$, which is a maximum value $S^+_{max}$.

After the positive phase detection, the algorithm proceeds with the search for the negative phase of the step, block 14, i.e., of a negative acceleration peak, by comparing the value of the acceleration datum CalAcc with the negative reference threshold $S^-$. In particular, the search for the negative phase of the step is executed within a certain time interval Mask, the value of which must be lower than a maximum interval Max_Mask from detection of the positive phase (corresponding to a certain number of samples, the value of which is determined also as a function of the sampling rate of the acceleration data).

Until a negative acceleration peak is detected, block 15, and as long as the time interval Mask is shorter than the maximum interval Max_Mask, block 16, the algorithm proceeds with the search for the negative phase of the step. In detail, the time interval Mask is incremented, block 17, a new acceleration datum CalAcc is acquired (and the values of the reference thresholds are modified accordingly), block 18 (which is equivalent to block 11), and the algorithm returns to block 14. If no negative phase of the step has been identified after expiry of the maximum interval Max_Mask, block 16, the algorithm returns to block 11 in order to look for a new potential positive phase of the step.

On the contrary, if the negative phase is identified within the maximum interval Max_Mask (i.e., the acceleration datum drops below the negative reference threshold S⁻), the processing unit 3 determines the occurrence of a step, and, block 20, increments the count of the detected steps. Furthermore, the estimate of the distance traveled is updated by adding to the previous value an estimate of the length of the current step LPS.

In detail, according to one embodiment of the present invention, block 21, the processing unit 3 calculates the estimate of the length of the current step LPS as a function of the maximum value $S^+_{max}$ reached by the positive reference threshold $S^+$ during the positive phase of the step, which is indicatory of the value of the positive acceleration peak. The actual length of the step varies with respect to a standard value determined on the basis of the physical characteristics of the user, according to the speed of the step, or, equivalently, to the amplitude of the generated acceleration. Consequently, the estimate of the length of the current step LPS is calculated via the formula:

$$LPS = LP \cdot f(S^+_{max})$$

where LP is a standard length of the step, corresponding to 0.4 to 0.5 times the height of the user, and $f(S^+_{max})$ is a corrective function, for example a linear one, based upon the maximum value $S^+_{max}$. The corrective function $f(S^+_{max})$ can be tabulated on the basis of experimental tests, which enable association to a given maximum value $S^+_{max}$ of an appropriate correction to be made to the standard length of the step LP. In particular, the function $f(S^+_{max})$ is conveniently stored in the processing unit 3.

The algorithm then proceeds, block 22, by increasing the distance traveled on the basis of the estimate of the length of the current step LPS, previously calculated. Furthermore, block 23, further variables supplied at output from the pedometer device 1 can be updated, such as the number of calories (also in this case, the previous count is updated by adding an average consumption of calories per step), and the average and instantaneous speed of travel, which are calculated in a known way not described in detail herein.

Next, the algorithm returns to block 11 in order to detect a new acceleration profile indicating occurrence of a step.

There will now be described in detail, with reference to FIG. 4, the algorithm implemented by the processing unit 3 for determination of a new acceleration datum CalAcc and consequent updating of the values of the positive and negative reference thresholds $S^+$ and $S^-$, in such a manner that the aforesaid values will follow approximately the positive and negative envelope of the acceleration signal.

In brief, said algorithm envisages calculation, for each new acceleration datum CalAcc, of the values of the positive envelope Env⁺ and negative envelope Env⁻, and modification of the value of the positive and negative reference thresholds $S^+$ and $S^-$ as a function of the positive envelope Env⁺ and negative envelope Env⁻, respectively.

In detail, in an initial block 30, the processing unit 3 acquires from the accelerometer 2 a new acceleration sample Acc of the acceleration A. Then, block 31, the d.c. component of said acceleration value (due substantially to the acceleration of gravity) is eliminated so as to determine the acceleration datum CalAcc, with zero mean value, which will be used subsequently in the algorithm. In detail, the mean value Accm of the acceleration sample Acc is calculated with the expression:

$$Accm = \gamma \cdot Accm + (1-\gamma) \cdot CalAcc$$

where $\gamma$ is a constant between 0 and 1, for example equal to 0.95, and Accm and CalAcc are the values, respectively, of the mean value and of the acceleration datum, which were calculated at the previous acquisition. The new acceleration datum CalAcc is calculated by applying the relation:

$$CalAcc = Acc - Accm$$

Then, the algorithm proceeds with the determination of the new values of the positive and negative envelopes Env⁺, Env⁻. In detail, block 32, if the value of the acceleration datum CalAcc is higher than the value of the positive envelope Env⁺ (as calculated at the previous acquisition), the new value of the positive envelope Env⁺ is set equal to the value of the acceleration datum CalAcc, block 33. Otherwise, block 34, the value of the positive envelope Env⁺ is set equal to a proper fraction of the previous value; i.e., the previous value is multiplied by a first constant $\alpha_1 < 1$, for example, $\alpha_1 = 0.9458$. In this way, the value of the envelope coincides substantially with the value of the acceleration datum, if the acceleration datum is greater than the previous value of the envelope, and otherwise decreases (in particular, almost exponentially) with respect to the previous value.

Likewise, block 35, if the value of the acceleration datum CalAcc is smaller than the negative envelope Env⁻ (as calculated at the previous acquisition), the new value of the negative envelope Env⁻ is set equal to the value of the acceleration datum CalAcc, block 36. Otherwise, block 37, the value of the negative envelope Env⁻ is set equal to a proper fraction of the previous value of the envelope; i.e., it is multiplied by a second constant $\alpha_2 < 1$, for example, $\alpha_2 = 0.9438$. Note, in particular, that the different value of the first and second constants $\alpha_1$, $\alpha_2$ is due to the different value of the positive and negative accelerations, said negative accelerations being of smaller intensity, since the negative phase of the step is a rebound of the positive phase.

The algorithm then proceeds with updating of the values of the reference thresholds as a function of the envelope values previously calculated. In detail, block 38, the value of the positive reference threshold $S^+$ is set equal to a certain proper fraction of the positive envelope Env⁺; in particular, it is set equal to the value of the positive envelope Env⁺ multiplied by a third constant $\beta < 1$, for example, $\beta = 0.65$. However, if the value thus calculated is less than the positive minimum value $S_1$, block 39, the value of the positive reference threshold $S^+$ is set at said positive minimum value $S_1$, block 40.

Likewise, block 41, the value of the negative reference threshold $S^-$ is set equal to a certain proper fraction of the negative envelope; in particular, also this value is multiplied by the third constant $\beta$. However, once again, if the value thus calculated is less than the negative minimum value $S_2$, block 42, the value of the negative reference threshold $S^-$ is set at the negative minimum value $S_2$, block 43.

The values of the new reference thresholds thus calculated are then used for detection of the positive and negative phases of the step, as described previously.

Figure 5:
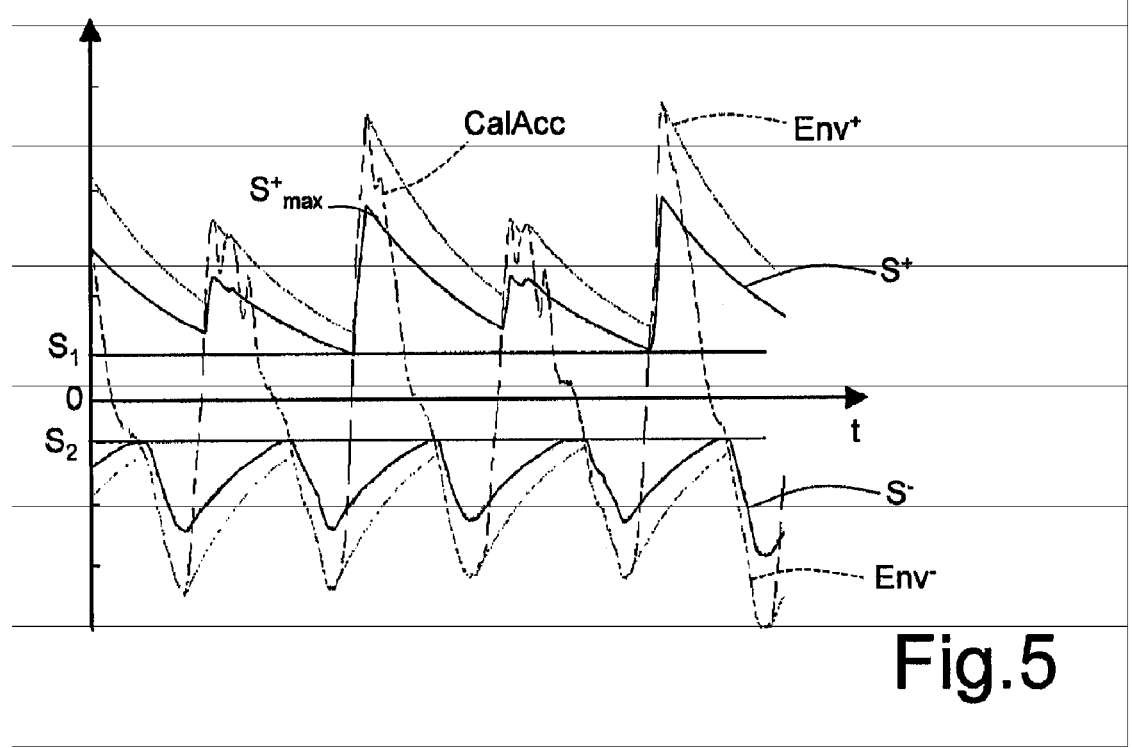
FIGS. 5-6 are graphs corresponding to the pattern of an acceleration signal during a step and of reference thresholds associated to the algorithm of FIG. 3.
Figure 6:
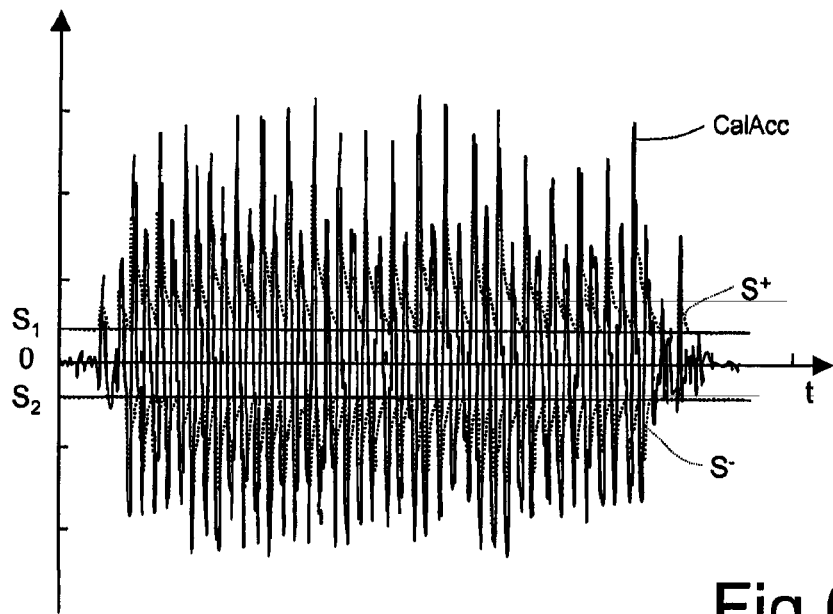

FIGS. 5 and 6 show the curves of the positive and negative reference thresholds $S^+$, $S^-$, and of the positive and negative envelopes Env⁺, Env⁻, calculated using the algorithm described previously, and the pattern of the acceleration signal CalAcc (constituted by the sequence of the acceleration data CalAcc). It is evident that the reference thresholds substantially follow the envelopes of the acceleration signal (which, in turn, follow the peaks of the acceleration signal).

In detail, the value of the positive acceleration threshold $S^+$ is initially equal to the positive minimum value $S_1$ (see, in particular, FIG. 6), and remains constant as long as the acceleration datum CalAcc remains less than the positive acceleration threshold $S^+$. Starting from the instant at which the acceleration datum CalAcc exceeds the positive acceleration threshold $S^+$, and as long as the acceleration datum CalAcc increases, the positive acceleration threshold $S^+$ follows, in a "damped" way, the increase of the acceleration datum CalAcc (see, in particular, FIG. 5). Next, the acceleration datum CalAcc starts to decrease, and, along with it, the positive acceleration threshold $S^+$, which, as long as the acceleration datum CalAcc decreases, assumes a decreasing pattern (without, however, dropping below the positive minimum value $S_1$). In particular, at the end of the positive phase of the step, the maximum value $S^+_{max}$ is stored. The positive reference threshold $S^+$ returns to the positive minimum value $S_1$ when the user comes to a halt. A similar pattern (in absolute value) is showed by the negative acceleration threshold $S^-$, with the difference that the decrease (in absolute value) of the negative acceleration threshold $S^-$ is different, in particular faster. Said difference is due to the different conformation of the negative acceleration peak, which has a smaller amplitude and a longer duration as compared to the positive acceleration peak, so that an excessively long decrease time could lead to the peak not being detected. The difference, in absolute value, of the positive minimum value $S_1$ and of the negative minimum value $S_2$ is due to the same reason.

According to one embodiment of the present invention, the positive minimum value $S_1$ and the negative minimum value $S_2$ can be modified from outside, for example through the interface 5 in order to modify the sensitivity of the pedometer device 1. In particular, if said minimum values are decreased, the sensitivity of the device increases, in so far as acceleration peaks of smaller amplitude (for example, due to a particularly slow gait or to a surface that is not very rigid) can be detected. At the same time, however, the number of false positives detected increases, in so far as noise (external vibrations, bumps, fast movements made by the user) is more likely to cause erroneous detections assimilated to the phases of the step.

The advantages of the pedometer device and of the corresponding step detection method are clear from the foregoing description.

In any case, it is emphasized that the pedometer device 1 is able to adapt to changes in the acceleration profile, for example due to an increase in the walking speed, and so external interventions for resetting the acceleration thresholds necessary for step detection are not needed.

The fact that the acceleration thresholds follow the envelopes of the acceleration signal (analogously to an electronic peak detector) enables said changes to be followed rapidly, without any risk for any loss of steps and counting errors occurring, and at the same time enables a good insensitivity to noise to be achieved. In particular, when the accelerations increase (in absolute value), for example because the walking speed has increased, the reference thresholds increase rapidly, so as to adapt rapidly to the new conditions. When, instead, the accelerations decrease, for example because the user is slowing down, the reference thresholds also decrease, but slowly, and always remaining above a minimum value. In this way, the device is able to follow closely a new increase in the acceleration values.

Finally, it is clear that modifications and variations can be made to what is described and illustrated herein without thereby departing from the scope of the present invention, as defined in the appended claims.

Figure 7:
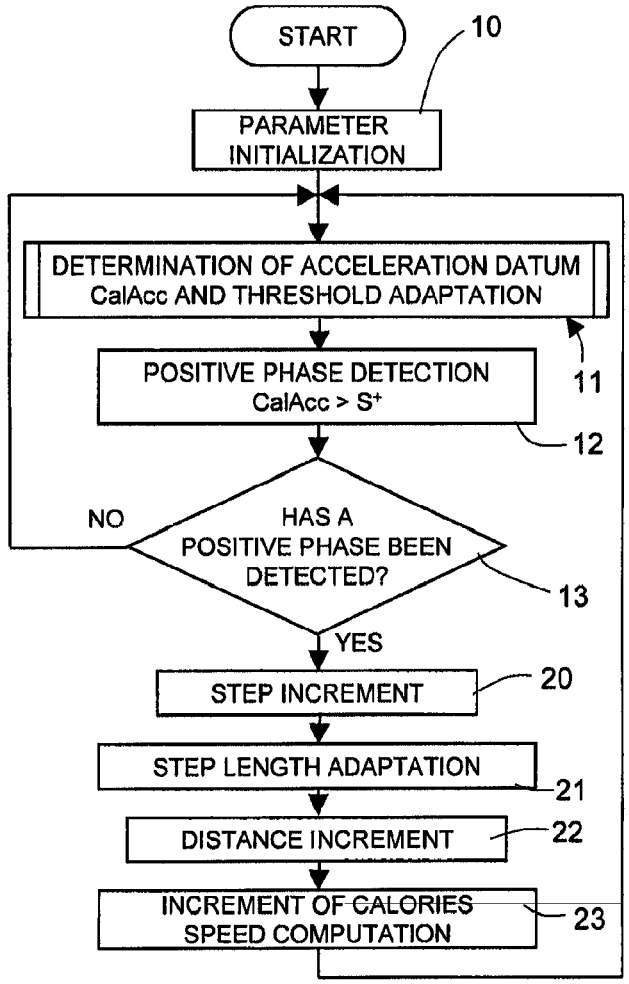
FIG. 7 shows a possible variant of the flowchart of FIG. 3.

In particular, as shown in FIG. 7, in which the same reference numbers are used for designating blocks similar to the ones previously described, according to an alternative embodiment of the present invention, the step detection algorithm can be simplified, and can be based exclusively upon the identification of the positive phase of the step (i.e., of the positive acceleration peak). In this case, the algorithm uses a single reference threshold, in particular the positive reference threshold $S^+$, which is modified as a function of the value of the positive envelope $Env^+$, in a way altogether similar to what has been described previously. Said simplified algorithm, although computationally less burdensome for the processing unit 3, has, however, the disadvantage of being more sensitive to noise. In fact, the lack of check on the presence of the negative phase, after the positive phase, renders false detection and counting errors more likely.

The accelerometer 2 could be equipped with a number of axes of measurement, for example three mutually orthogonal axes of measurement, and be built, for example, as described in "3-axis Digital Output Accelerometer For Future Automotive Applications", B. Vigna et al., AMAA 2004. In this case, according to one embodiment of the present invention, the algorithm implemented by the processing unit 3 envisages identifying the main vertical axis to be used for step detection as the axis of detection that has the highest mean acceleration value Accm (on account of gravity). For example, the main vertical axis can be identified at each acquisition of a new acceleration sample, block 30 of FIG. 4, so as to take into account variations in the orientation of the pedometer device 1, and consequently of the accelerometer 2 arranged inside it.

Instead of being integrated in the pedometer device 1, the accelerometer 2 could be arranged outside the casing thereof, and connected, in a wired or wireless way, to the detection unit 3. In this case, the accelerometer 2 could advantageously be housed in a garment or accessory worn by the user, for example a shoe, a belt, a watch, etc.

Figure 8:
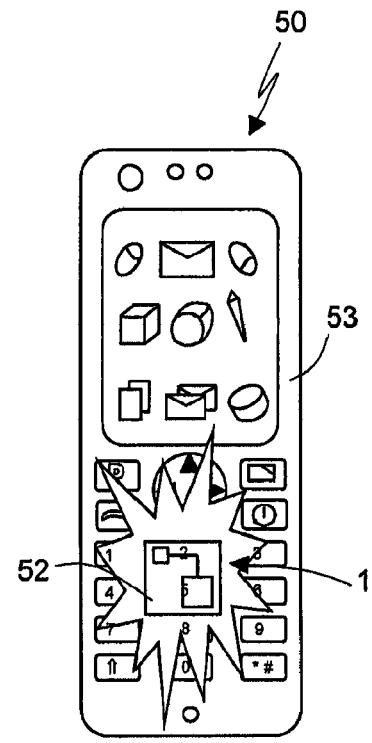
FIG. 8 is a partially exploded schematic view of a portable device, in particular a mobile phone, incorporating the pedometer device of FIG. 1.

As shown in FIG. 8, the pedometer device 1, due to its reduced dimensions, may advantageously be housed inside a portable device, in particular a mobile phone 50 (or else an Mp3 reader, a camera, a PDA, a game console, etc.). In this case, the accelerometer 2, and the processing unit 3 are mounted on a printed circuit board 52 fixed within a casing 53 of the mobile phone 50. Advantageously, in this embodiment, the processing unit 3, in addition to implementing the algorithms previously described, controls the operation of the mobile phone 50. Likewise, the display screen 4, which is obviously arranged so as to be visible from outside the casing 53, shows both information corresponding to the pedometer device 1 and, more in general, information linked to operation of the mobile phone 50. The interface 5 in this case preferably comprises a communication port (of a known type, and not shown), which can be interfaced with a personal computer. The interface 5 can therefore be used both for downloading the data produced by the pedometer device 1 (among which at least the number of steps counted) and for uploading into the processing unit 3 operating parameters of the pedometer device 1, such as the positive and negative minimum values $S_1$, $S_2$.

Finally, even though the entire description refers to a digital implementation of the pedometer device 1, it is evident that a similar version of an analog type (comprising, among other things, threshold comparators, a peak detector, amplifiers, etc.) can be contemplated by making the appropriate obvious substitutions.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A pedometer device for detecting and counting steps of a user, the device comprising:

an accelerometer sensor configured to detect an acceleration generated during a step; and a processing unit coupled to said accelerometer sensor, and configured to process an acceleration signal relating to said acceleration to detect an occurrence of the step, said processing unit including:

first comparator means for comparing said acceleration signal with a first reference threshold, said processing unit being configured to detect the occurrence of the step based on a result of said comparing between said acceleration signal and said first reference threshold, and threshold-adaptation means for modifying, at each acquisition of a new sample of said acceleration signal, said first reference threshold as a function of an envelope of an amplitude of said acceleration signal.

2. The device according to claim 1, wherein said processing unit further includes envelope-calculation means for calculating said envelope of said amplitude of said acceleration signal, and wherein said threshold-adaptation means modifies automatically said first reference threshold as said function of said envelope so that said first reference threshold follows a variation of said envelope.

3. The device according to claim 2, wherein said threshold-adaptation means are configured to assign to said first reference threshold a value equal to a fraction of a value of said envelope, said fraction being smaller than 1.

4. The device according to claim 3, wherein said fraction is approximately 0.65.

5. The device according to claim 3, wherein said processing unit further includes:

length-estimation means for determining an estimated step length at each step detection, as a function of a maximum value of said first reference threshold; and distance-calculation means for calculating a distance traveled by said user as a function of said estimated step length.

6. The device according to claim 1, wherein said processing unit further includes: mean-value calculation means for calculating a d.c. component of the acceleration detected by said accelerometer sensor; for eliminating said d.c. component from said acceleration; and for producing said acceleration signal.

7. The device according to claim 1, wherein said accelerometer sensor includes a micro-electromechanical system (MEMS) sensor, and said acceleration is directed along a vertical axis.

8. The device according to claim 7, wherein said processing unit further includes axis-determination means for determining a vertical axis of detection of said accelerometer sensor, along which said acceleration is to be detected.

9. A pedometer device for detecting and counting steps of a user, the device comprising:

an accelerometer sensor configured to detect an acceleration generated during a step; and a processing unit coupled to said accelerometer sensor, and configured to process an acceleration signal relating to said acceleration to detect an occurrence of the step, said processing unit including:

first comparator means for comparing said acceleration signal with a first reference threshold, said processing unit being configured to detect the occurrence of the step based on a result of said comparing between said acceleration signal and said first reference threshold, and threshold-adaptation means for modifying said first reference threshold as a function of said acceleration signal, wherein said first reference threshold has positive values, and wherein said processing unit further includes second comparator means for comparing said acceleration signal with a second reference threshold having negative values; and wherein said threshold-adaptation means are further for modifying automatically said second reference threshold as a function of an envelope of an amplitude of said acceleration signal.

10. The device according to claim 9, wherein said first and second reference thresholds have, in absolute value, a respective lower-limit value, and wherein said processing unit further includes setting means for setting said lower-limit value.

11. The device according to claim 9, wherein said processing unit is configured to detect the occurrence of the step, when said acceleration signal has a given relation with said first reference threshold, and subsequently with said second reference threshold within a given time interval.

12. An electronic mobile phone, comprising:

a casing; and a pedometer device housed in said casing to detect and count steps of a user, the pedometer device including:

an accelerometer sensor configured to detect an acceleration generated during a step; and a processing unit coupled to said accelerometer sensor, and configured to process an acceleration signal relating to said acceleration to detect an occurrence of the step, said processing unit including:

first comparator means for comparing said acceleration signal with a first reference threshold, said processing unit being configured to detect the occurrence of the step based on a result of said comparing between said acceleration signal and said first reference threshold, and threshold-adaptation means for modifying, at each acquisition of a new sample of said acceleration signal, said first reference threshold as a function of an envelope of an amplitude of said acceleration signal.

13. The mobile phone according to claim 12, wherein said processing unit further includes envelope-calculation means for calculating said envelope of said amplitude of said acceleration signal, and wherein said threshold-adaptation means modifies automatically said first reference threshold as said function of said envelope so that said first reference threshold follows a variation of said envelope.

14. The mobile phone according to claim 12, wherein said processing unit further includes: mean-value calculation means for calculating a d.c. component of the acceleration detected by said accelerometer sensor; for eliminating said d.c. component from said acceleration; and for producing said acceleration signal.

15. The mobile phone of claim 12, further comprising:

a circuit board on which said accelerometer sensor and processing unit are mounted;

a casing to house said circuit board;

a display screen arranged to be visible from outside of said casing and configured to display information corresponding to said pedometer device; and an interface coupled to said pedometer device to communicate data with said pedometer device.

16. An electronic mobile phone, comprising:

a casing; and a pedometer device housed in said casing to detect and count steps of a user, the pedometer device including:

an accelerometer sensor configured to detect an acceleration generated during a step; and a processing unit coupled to said accelerometer sensor, and configured to process an acceleration signal relating to said acceleration to detect an occurrence of the step, said processing unit including:

first comparator means for comparing said acceleration signal with a first reference threshold, said processing unit being configured to detect the occurrence of the step based on a result of said comparing between said acceleration signal and said first reference threshold, and threshold-adaptation means for modifying said first reference threshold as a function of said acceleration signal, wherein said first reference threshold has positive values, and wherein said processing unit farther includes second comparator means for comparing said acceleration signal with a second reference threshold having negative values; and wherein said threshold-adaptation means are further for modifying automatically said second reference threshold as a function of an envelope of an amplitude of said acceleration signal.

17. The mobile phone according to claim 16, wherein said first and second reference thresholds have, in absolute value, a respective lower-limit value, and wherein said processing unit further includes setting means for setting said lower-limit value.

18. A step detection method for detecting steps in a gait of a user, the method comprising:

producing an acceleration signal relating to an acceleration generated during a step; and processing said acceleration signal to detect an occurrence of the step, said processing including:

comparing said acceleration signal with a first reference threshold to detect the occurrence of the step based on a result of said comparing between said acceleration signal and said first reference threshold, and modifying, at each acquisition of a new sample of said acceleration signal, said first reference threshold as a function of an envelope of an amplitude of said acceleration signal.

19. The method according to claim 18, wherein the processing further includes calculating said envelope of said amplitude of said acceleration signal, and wherein the modifying includes modifying automatically said first reference threshold as said function of said envelope so that said first reference threshold follows a variation of said envelope.

20. The method according to claim 19, wherein the modifying includes assigning to said first reference threshold a value equal to a fraction of a value of said first envelope, said fraction being smaller than 1.

21. The method according to claim 20, wherein the fraction is approximately 0.65.

22. The method according to claim 20, wherein the processing further includes:

determining an estimated step length at each step detection, as a function of a maximum value of said first reference threshold; and calculating a distance traveled by said user as a function of said estimated step length.

23. The method according to claim 18, wherein producing an acceleration signal includes: calculating a d.c. component of said acceleration; and eliminating said d.c. component from said acceleration to produce said acceleration signal.

24. The method according to claim 18, wherein producing the acceleration signal includes determining a vertical axis of detection along which said acceleration is to be detected.

25. A step detection method for detecting steps in a gait of a user, the method comprising:

producing an acceleration signal relating to an acceleration generated during a step; and processing said acceleration signal to detect an occurrence of the step, said processing including:

comparing said acceleration signal with a first reference threshold to detect the occurrence of the step based on a result of said comparing between said acceleration signal and said first reference threshold, and modifying said first reference threshold as a function of said acceleration signal, wherein said first reference threshold has positive values; and wherein the processing further includes comparing said acceleration signal with a second reference threshold having negative values; and the modifying further including modifying automatically said second reference threshold as a function of an envelope of said acceleration signal.

26. The method according to claim 25, wherein said first and second reference thresholds have, in absolute value, a respective lower-limit value, and wherein the processing includes setting said positive and negative lower-limit values.

27. The method according to claim 25, wherein the processing includes detecting the occurrence of the step, when said acceleration signal has a given relation with said first reference threshold, and subsequently with said second reference threshold within a given time interval.

28. A pedometer device to detect and count steps of a user, the device comprising:

an accelerometer sensor configured to detect an acceleration generated during a step; and a processing unit coupled to said accelerometer sensor, and configured to process an acceleration signal relating to said acceleration to detect an occurrence of the step, said processing unit further is configured to:

compare said acceleration signal with a first reference threshold, and modify said first reference threshold as a function of said acceleration signal, wherein said first reference threshold has positive values, and wherein said processing unit is further configured to compare said acceleration signal with a second reference threshold having negative values, and further configured to modify automatically said second reference threshold as a function of an envelope of an amplitude of said acceleration signal.

29. The device according to claim 28 wherein said first and second reference thresholds have, in absolute value, a respective lower-limit value, and wherein said processing unit is further configured to set said lower-limit value.

30. The device according to claim 28 wherein said processing unit is configured to detect the occurrence of the step, when said acceleration signal has a given relation with said first reference threshold, and subsequently with said second reference threshold within a given time interval.

* * * * *